9,057
L
I. Jennings.
Turpentine Still.
Patented Aug. 27, 1835.
9,057 X
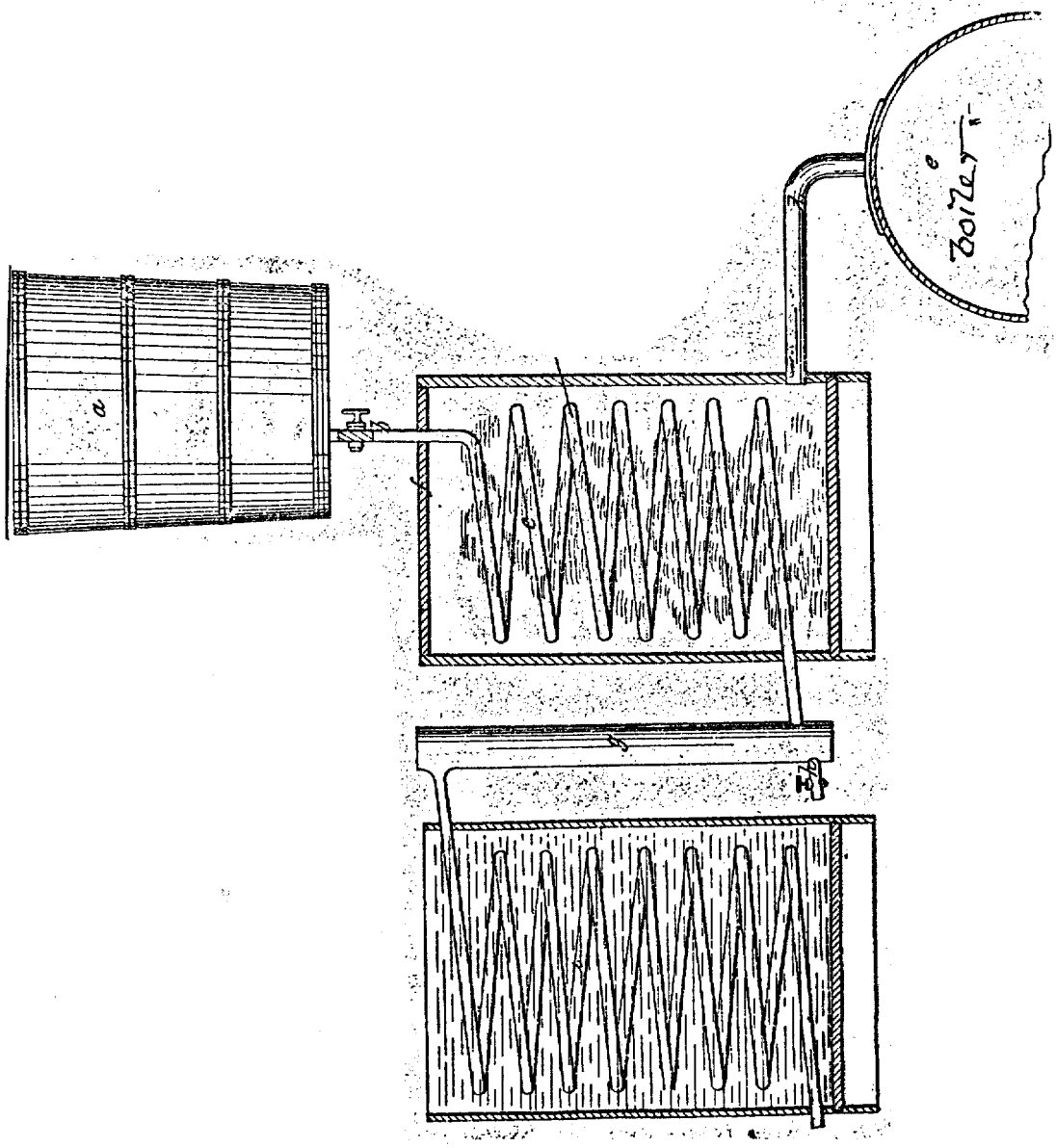

UNITED STATES PATENT OFFICE.

ISAIAH JENNINGS, OF NEW YORK, N. Y. X9057

IMPROVEMENT IN THE PROCESS OF AND APPARATUS FOR THE DISTILLATION OF SPIRITS OF TURPENTINE, THE SPIRITS FROM COMMON TAR, COAL-TAR, AND OTHER ANALOGOUS ARTICLES.

Specification forming part of Letters Patent dated August 27, 1835.

*To all whom it may concern:*

Be it known that I, ISAIAH JENNINGS, of the city of New York and the State of New York, have invented certain Improvements in the Process and also in the Apparatus Employed for the Distillation of Spirits of Turpentine, the Spirits from Common Tar, Coal-Tar, and other Analogous Articles; and I do hereby declare that the following is a full and exact description thereof.

My improvement in the process when turpentine is to be distilled consists in the addition of a portion of spirits of turpentine to the crude turpentine from which the distillation is to be made, the addition being made in such proportion as shall bring the turpentine into such a state of fluidity as shall admit of the subsidence of all the foreign matter contained therein as may be sufficiently weighty to fall to the bottom and of the rising of chips and other light materials to the surface, whence they may be readily removed and the clear turpentine poured off from the sediment. The quantity of spirits of turpentine to be added will depend in part upon the warmth of the weather or of the place in which the mixture is made, and also upon the thickness of the turpentine to be operated upon and the impurities which it may contain. The mixture and separation of the impurities may be promoted by artificial heat, care being taken that the temperature is not such as shall occasion a waste of the spirit by evaporation.

The apparatus which I employ consists of two vessels, within each of which a still-worm of the usual construction is to be contained; or, instead of the worm, any kind of heater or refrigerator by which analogous effects are produced may be employed. These vessels are to be connected together in a way to be presently described, and one of them is to answer the purpose of a still, while the other is to operate as a refrigerator or condenser.

The prepared turpentine is to be contained in any convenient reservoir, whence it may descend through a tube into the worm, which is to operate as a distillatory, its flow being regulated by a stop-cock. The vessel containing this worm is to be closed at top, and the worm is to be heated by the introduction of steam, heated air, water, or other fluid, steam, however, being preferred. A sufficient degree of heat may be thus applied to separate the spirit from the rosin as the material descends from the top to the bottom of the worm. The lower end of this worm passes through the vessel and into a large vertical tube, which is placed between it and the refrigerator or condenser. This vertical tube rises as high as the top of the condenser and descends several inches below the point at which the first-named worm enters it, having below this point a tube for the discharge of the rosin, which, not being volatile, will descend and run out by its own gravity. Its flow may be regulated by a stop-cock, and may be promoted, if necessary, by the application of heat to the bottom of the tube. The vapor of the spirit will rise toward the upper end of the tube, whence it will pass into the refrigerating-worm contained in the condensing-tube, down which it will pass and be condensed in the usual way.

I intend to apply the same apparatus to the distillation of common tar, coal-tar, and other analogous articles, diluting them also with a portion of their own spirit or with any other that will produce a like effect.

What I claim as my invention is—

1. The preparing the turpentine for distillation by diluting it with distilled spirit and separating by this means the foreign matter therefrom, thereby producing a bright clear rosin and an improved spirit.

2. The employment of the worm or other analogous apparatus to be heated in the way described and arranged and connected in the manner or upon the principle herein set forth so that it may answer the purpose for which a still is ordinarily employed.

3. The preparing and distilling of common tar, coal-tar, and other analogous articles by dilution and subsequent distillation in the same apparatus.

ISAIAH JENNINGS.

Witnesses:
B. K. MORSELL,
G. L. GIBERSON.